United States Patent [19]
Hershey et al.

[11] Patent Number: 5,844,949
[45] Date of Patent: Dec. 1, 1998

[54] POWER LINE COMMUNICATION SYSTEM

[75] Inventors: John Erik Hershey, Ballston Lake; Richard August Korkosz, Rotterdam Junction; Gary Jude Saulnier, Rexford; Richard Charles Gaus, Jr., Burnt Hills; Kenneth Brakeley Welles, II, Scotia, all of N.Y.

[73] Assignee: General Electric Company, Schenectady, N.Y.

[21] Appl. No.: 728,020

[22] Filed: Oct. 9, 1996

[51] Int. Cl.[6] .............................. H04B 1/10; H04L 25/08; H03D 1/04
[52] U.S. Cl. ...................... 375/346; 375/259; 340/810.01
[58] Field of Search .................... 340/310.02, 310.03, 340/310.01; 375/260, 200, 205, 296, 295, 259; 385/27

[56] References Cited

U.S. PATENT DOCUMENTS

| | | |
|---|---|---|
| 5,185,591 | 2/1993 | Shuey . |
| 5,307,376 | 4/1994 | Castelain et al. . |
| 5,351,272 | 9/1994 | Abraham . |
| 5,404,127 | 4/1995 | Lee et al. ............................ 340/310.02 |
| 5,519,692 | 5/1996 | Hershey et al. ........................ 375/205 |
| 5,519,725 | 5/1996 | Hershey et al. . |
| 5,581,229 | 12/1996 | Hunt .................................... 340/310.01 |
| 5,666,382 | 9/1997 | Thakore .................................. 375/260 |
| 5,717,685 | 2/1998 | Abraham ............................ 370/310.01 |

OTHER PUBLICATIONS

"Multitone Signals With Low Crest Factor" by S. Boyd, IEEE Trans. on Circuits and Systems, vol. CAS–33, No. 10, pp. 1018–1022.

"Substation Noise at Distribution Line Communications Frequencies", J. B. O'Neil, Jr., IEEE Trans. on Electromagnetic Compatibility, vol. 30, No. 1, Feb. 1988.

*Primary Examiner*—Stephen Chin
*Assistant Examiner*—Albert Park
*Attorney, Agent, or Firm*—Lawrence P. Zale; Marvin Snyder

[57] ABSTRACT

A system for communicating digital information over wires having a great deal of harmonic distortion, such as a power line, employs a transmitter which transmitter which creates a carrier wave for each of a plurality of signals to be sent. This carrier wave has frequency lobes positioned between the frequency lobes of the harmonic distortion. Each of the lobes of a single carrier signal is encoded with the same bit value during a given bit period. This signal is then mixed with any existing signal on the wire. At a remote receiver coupled to the wires, the signal is sensed, filtered, and Fourier transformed into coefficients. The signal-to-noise (S/N) ratio of each Fourier coefficient is determined by a novel S/N estimation technique. The coefficients are weighted based upon the S/N ratio estimation, and decoded, preferably by an inner product of the weighted Fourier coefficients. Additionally, the S/N ratio estimates could be time averaged before being used in the weighting and bit decoding.

7 Claims, 2 Drawing Sheets

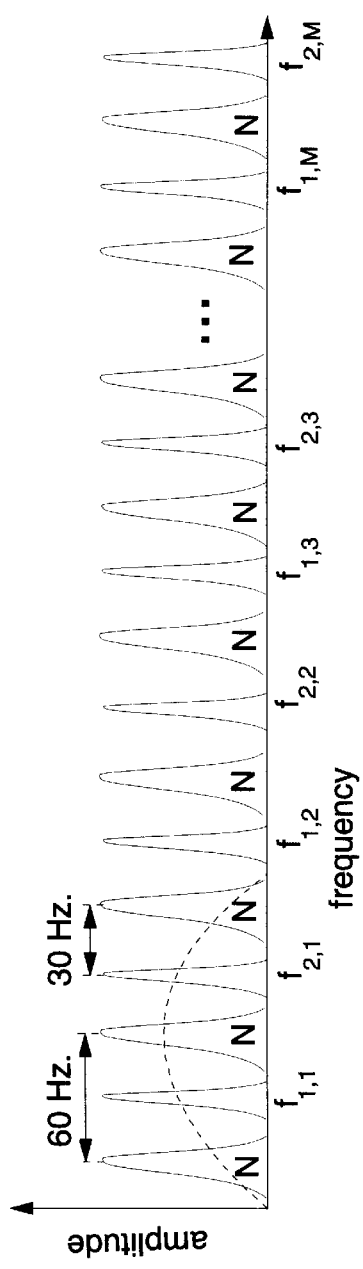
Fig. 1
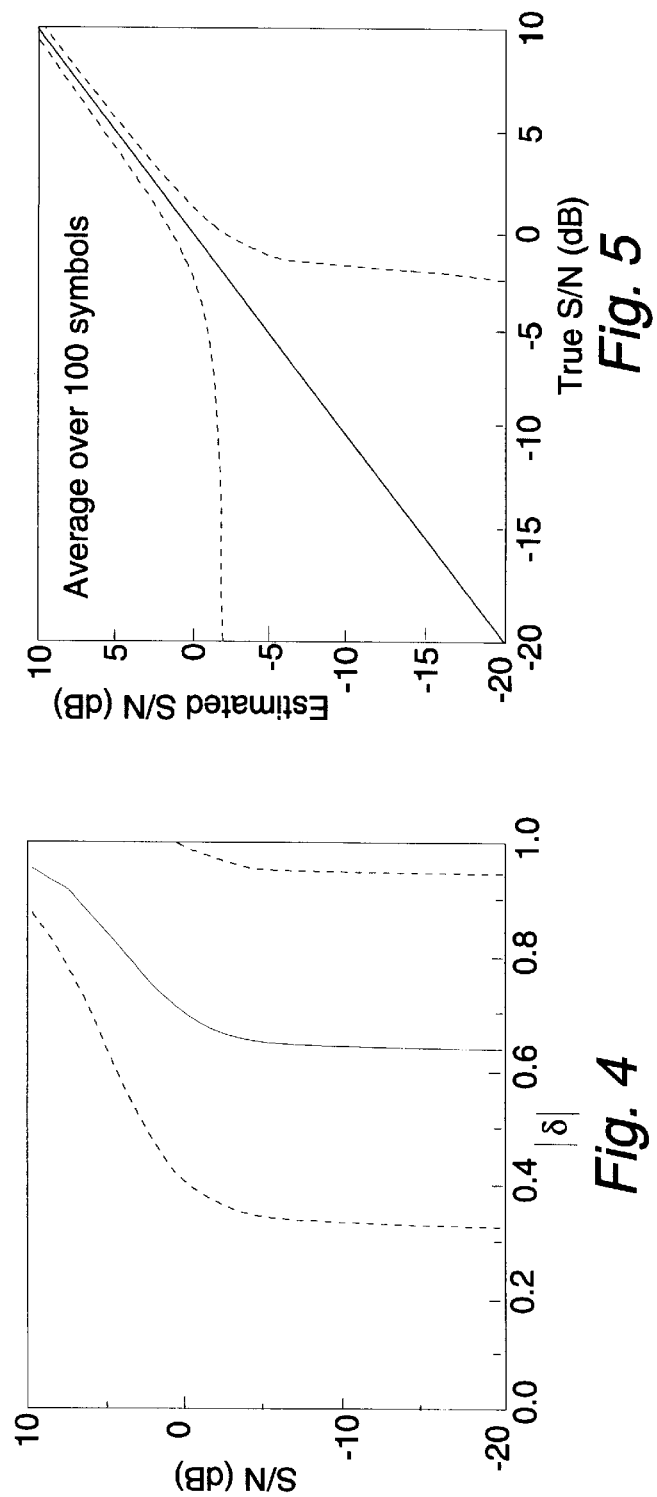
Fig. 5
Fig. 4

POWER LINE COMMUNICATION SYSTEM

BACKGROUND OF THE INVENTION

1. Field of the Invention

The present invention relates to communications systems and more particularly to systems communicating a signal over existing power lines.

2. Description of Related Art

Electric power companies typically have a service person visit customers and read a power meter to determine the amount of power consumed for billing purposes. This can become very cumbersome and time consuming with a large number of customers.

It would be beneficial for power companies to read these electric power meters remotely. Since there are existing power wires to each customer's power meter, the existing power wires may possibly be used to communicate with the power meters, however, existing modulation techniques may not operate easily in the high-power, high-noise environment of a power line.

An additional problem involves voltage transformers, which are inherently inductively coupled and thereby introduce non-linear phase shifts in a signal passing through the transformer.

Complicated communications systems are required to perform reliably in the high-power, high-noise, phase distorted power line channels. For example, some of these systems monitor different frequency channels, select an appropriate channel, and then indicate the appropriate frequency to other communicating units.

Some, such as U. S. Pat. No. 5,185,591 Shuey issued Feb. 9, 1993, employ a plurality of signals which are not harmonically related. This requires complicated filtering and signal extraction.

Currently there is a need for a less complicated communication system which can employ existing power lines to remotely read multiple power meters simultaneously.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawing in which:

FIG. 1 is a graph of a Harmonic Modulation (HM) signaling power spectra of the present invention intended to be interleaved with power line interference.

FIG. 4 is an graph of a signal-to-noise (S/N) ratio estimation curve.

FIG. 5 is graph of estimated vs. actual S/N ratios after averaging.

OBJECTS OF THE INVENTION

Figure 2:
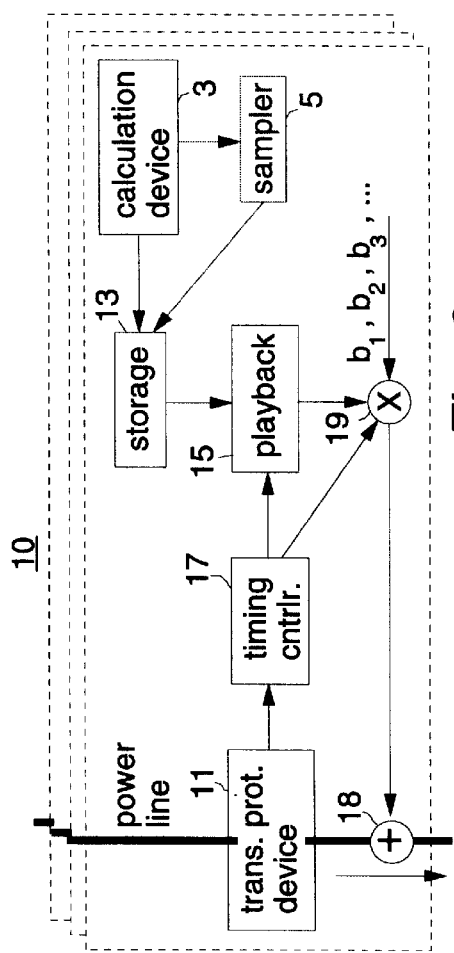
FIG. 2 is a simplified block diagram of a power line communication transmitter employing modified GHM signaling waveform according to the present invention.

It is an object of the present invention to provide a system to communicate information over a power line.

It is another object of the present invention to provide a modulation scheme which can reliably communicate a message over a channel having a great deal of harmonic interference, e.g., consisting of many lobes centered at frequencies that are multiples of the power fundamental frequency.

SUMMARY OF THE INVENTION

A communication system transmits message bits over a wire having harmonic interference lobes, such as a power line.

A carrier wave synthesis device creates a carrier wave having a plurality of frequency lobes selected to be positioned between interference lobes.

In a preferred embodiment, the a calculation device preprocesses a carrier waveform and stores it in a storage device. The calculation device may be a digital device which synthesizes samples of the waveform, or be a device which produces a continuous waveform which is sampled by a sampler. In its most general form, the calculation device produces a waveform with frequencies between the harmonic interference lobes, and in a preferred embodiment, is defined according to a Shapiro-Rudin sequence, described in "Multitone Signals with Low Crest Factor" by S. Boyd, IEEE Trans. on Circuits and Systems, Vol. CAS-33, No. 10, pp. 1018–1022.

The samples of this waveform are stored in a storage device, such as a ROM. This set-up portion need not be repeated unless a different carrier waveform is desired.

A timing device in the transmitter monitors the power signal passing through the power line for timing reference and control purposes.

A playback device is coupled to the timing device and the storage device and plays back the prestored waveform according to a predetermined rate.

A bit encoder is provided with digital information to be transmitted. This information is converted from a series of ones and zeros to ones and negative ones. The bit encoder inverts the carrier waveform for a single bit period for one message bit value, and leaves the carrier wave unchanged for the other message bit value to create an encoded message.

The encoded message is mixed with existing signals on the power line by a summation device. A remote receiver coupled to the power line, decodes the received encoded message into message bits.

In the receiver, a sampler converts a continuous signal into a series of discrete time samples which are truncated by a quantizer.

A Fourier Transform device performs a Fourier transform on the samples to result in Fourier coefficients $X_k(t)$ at time t.

A decoder performs an inner product of the Fourier coefficients $X_k(t)$ and $X_k^*(t-1)$, and tests if the real part of the inner product is above or below a predetermined threshold. Above or at the threshold is one bit value, while other values produce the other bit value. In this way the decoder produces decoded message bits.

A signal-to-noise (S/N) estimation device may be employed which computes a reliability indicator estimate $|\delta_k|$ for each of the Fourier coefficients $X_k$.

A combiner weights each of the frequency coefficient $X_k(t)$ according to its $|\delta^k|$ to result in weighted Fourier coefficients $X_k(t)$ used by the decoder in place of $X_k(t)$ in determining bit decisions.

An averager may also be employed between the S/N estimation device and the combiner. It receives a plurality of $|\delta_k|$, and performs a time average for each of the $|\delta_k|$ to result in an average S/N estimate $|\overline{\delta_k}|$ for each Fourier coefficient. This $|\overline{\delta_k}|$ is then provided to the combiner, and used in place of $|\delta_k|$ to result in the modified Fourier coefficients $X_k(t)$, having greater accuracy.

DETAILED DESCRIPTION OF THE INVENTION

Basic GHM

Geometric Harmonic Modulation (GHM) for communications systems has been described for radiowave communication in U.S. Pat. No. 5,519,725 issued May 21, 1996, "Geometric Harmonic Modulation (GHM) for Combined Analog/Digital Transmissions", Hershey, Saulnier, Hassan, assigned to the present assignee and hereby incorporated by reference.

GHM allocates signaling energy into lobes, or tones, at different frequencies being evenly spaced at geometrically increasing multiples of a base frequency. The GHM signaling waveforms $\{W_n(\Phi,R;t)\}$ are true spread spectrum signals in that the signal bandwidth, the bandwidth from the lowest frequency tone to the highest, vastly exceeds the information bandwidth conveyed by the GHM transmission.

Binary GHM signals convey binary data by inverting or not inverting the GHM waveform $\{W_n(\Phi,R;t)\}$ during a bit duration interval.

It is not necessary for the GHM transmitter and GHM receiver to "agree" on the best frequency on which to send data as the same data is sent on each of the GHM tones which are spread throughout the 5–10 kHz band. Thus the operation or signaling protocol of the GHM system is less complex than a single tone system for which the transmitter and receiver must jointly search for and agree upon a frequency which is not attenuated by a fading phenomenon such as standing waves for example.

It was found that by modifying the GHM signaling waveform $\{W_n(\Phi,R;t)\}$, that it can have spectral properties well suited to the synchronous noise environment encountered on much of the power line network.

By taking a more general look at GHM and the power line noise, it is determined that lobes of the modulated signal should be positioned on a frequency spectrum interleaved with the power line noise. Since power line noise has a great deal of interference at the basic oscillation frequency, and at overtones, multiples of the basis frequency, the signal should not reside in these frequency regions. By modulating the signal to be between the interference lobes, the signal will be defined by:

$$s_i(t) = \sum_{k=1}^{M} \{\alpha_k \sin(2\pi f_{ik}t + \phi_k) + \beta_k \cos(2\pi f_{ik}t + \theta_k)\} \qquad \text{Eq. (1)}$$

where M is the number of lobes of the signal $s_i(t)$, and i indicates one of a plurality of different signals which may be transmitted simultaneously. The phases $\Phi_k$, $\theta_k$ of Eq. (1) may be assigned specific values for each signaling set or, in its most general form, may take on random values for any desired signaling set. A particular choice of phases, along with amplitudes and frequencies, determines a unique signaling set that may be used for a particular power line communication application depending on considerations of information capacity, multiplicity of users, line coupling response, and communication channel characteristics.

By selecting frequencies $f_{ik}$ correctly, the signals $s_1$ may be interleaved with harmonic power line noise and will be referenced to as Harmonic Modulation (HM).

In FIG. 1, a frequency v. amplitude spectrum graph shows harmonic power line noise lobes, marked "N" at the basic frequency (here 60 Hz), and integer multiples of the basic frequency. An HM signal to be sent $s_1$ has frequency components $f_{11}, f_{12}, \ldots f_{1M}$. Similarly, HM signal $S_2$ has components $f_{21}, f_{22}, \ldots f_{2M}$. Again, each frequency component of signal i carries the same information.

Also, a dotted trace depicts an example of frequency-selective fading. The example shows the first frequency lobes of signals $s_1$, and $S_2$ being $f_{11}$, and $f_{21}$, will be attenuated, (having a lower S/N ratio) while other frequencies will be unaffected.

Modifying GHM Frequencies

The HM signal of FIG. 1 has no appreciable frequency content at 60 Hz and its harmonics. Thus, such a modified GHM signal may be received over a power line communication link without much interference from the 60 Hz synchronous signal.

Note also that the parameter M controls the number of local maxima ("main lobes") of the power spectral density and the signaling rate controls the spectral width of the main lobes. For a meter reading or other power line communications application, a larger value of M may be used for greater spectrum spreading.

The spectrum of the modified HM signaling waveform must be in a frequency range which will be sufficiently above the 60 Hz fundamental frequency and still carry through a distribution transformer. The modulation of the HM waveform must not be significantly affected or corrupted by non-linear phase shifts which occur as a signal passes through an inductively coupled transformer.

Phase Shift Keying

Phase Shift keying signaling may be Differential or Coherent. If the signaling is Differential (DPSK), then the receiver need not correct for frequency selective phase rotations. The receiver will incur a non coherent combining loss as a trade for the relative simplicity of the demodulation algorithm. If coherent signaling is used, the receiver may be able to achieve a higher signal-to-noise ratio at the expense of greater demodulation complexity.

By selecting DPSK in the present invention the system is less sensitive to phase distortion introduced by non-linear transformers and results in a less complex system.

S/N Estimates

Frequency selective fading typically occurs in received signals due to standing wave phenomena and there is therefore a need to devise a low complexity algorithm to estimate the signal-to-noise ratio (S/N) of each of the tones in the multi-tone signal. Such information is required in order to better merge information from received tones to make a better decision in demodulating an information bit. Conventional methods, such as maximal ratio combining, may be used. Tones that are highly corrupted by noise may not be used at all.

The receiver can estimate the S/N of each tone in additive white Gaussian noise (AWGN) by computing, for each tone k, the absolute value of the normalized dot product, $|\delta^k|$, between $X_k(t-1)$ and $X^*_k(t)$ where $X_k(\cdot)$ is the Fourier coefficient, and $X^*(\cdot)$ is the complex conjugate of $X_k(\cdot)$. This value of $|\delta_k|$ can be computed by the following. Assume $X_k(t-1)=x_1+jy_1$ and $X_k(t)=x_2+jy_2$ then $$|\delta_k| = \left| \frac{x_1 x_2 + y_1 y_2}{\sqrt{x_1^2 + y_1^2} \sqrt{x_2^2 + y_2^2}} \right|. \qquad \text{Eq. (2)}$$

If AWGN is assumed for the bandwidth associated with a single tone, then $|\delta_k|$ may be used to determine S/N for each of the tones per the graph in FIG. 4.

Bit Determination

If Differential Phase Shift Keying were used and if the GHM signal were unaffected by frequency selective fading on the channel, and if the noise were AWGN, then near optimal demodulation could be effected by simply computing the inner product:

$$b = \sum_{k=1}^{M} X_k(t-1) X_k^*(t). \quad \text{Eq. (3)}$$

If $Re(b) \geq 0$, the decoded bit value being "0", and $Re(b) < 0$ the decoded bit value being "1", where $Re(b)$ is the real part of the complex number b.

Transmitter Implementation

FIG. 2 shows a simplified block diagram of a transmitter 10 coupled to a power line. This is one of many transmitters which may be coupled to the same power line. A given number of tones M to be transmitted is selected. Signals according to Eq. (1) are then synthesized by a calculation device 3, which may be a general purpose computer, or may be a device which creates a continuous waveform which is sampled by sampler 5. The samples are saved in storage device 13. Storage device 13, in its preferred embodiment is a ROM. This may all be performed prior to transmission, and need not be performed before each use of transmitter 10.

Preferably, a transient protection device 11 which limits power surges, protecting equipment downline, is coupled to the power line, and passes the signal to a timing device 17.

Timing device 17 determines master timing information from the fundamental power line frequency, for example by counting zero-crossings.

A playback device 15 coupled to storage device 13, reads out the samples at a rate synchronous with the power line voltage.

A multiplier 19, also coupled to timing device 17, multiplies the waveform created by playback device 15 by a single bit during a single bit period. The bit sequence is modified prior to transmission changing bit values to a series of ones and negative ones, instead of ones and zeros. Therefore, when the waveform and signal bits are provided to multiplier 19, a bit value of one will not change the waveform for a bit period, while a negative one will invert the waveform. This results in an HM modulated signal which is summed with the power line signal at a summer 18, and communicated over the power line to a receiver.

Receiver Implementation

Figure 3:
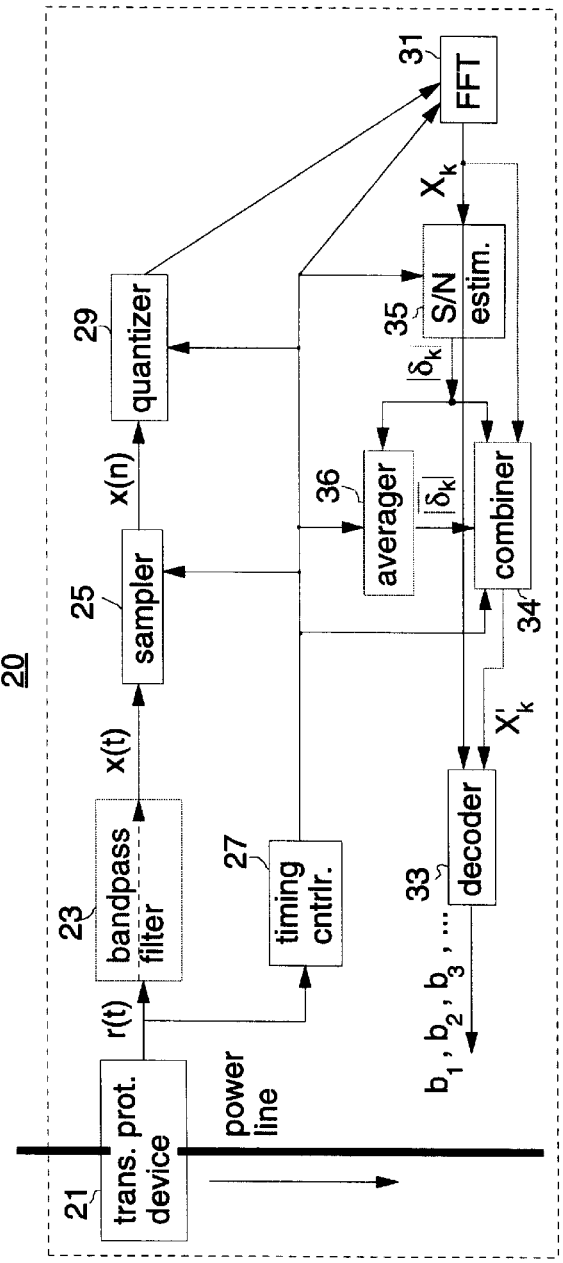
FIG. 3 is a simplified block diagram of an embodiment of a power line communication receiver for decoding harmonic modulation (HM) signaling according to the present invention.

FIG. 3 shows a simplified HM receiver 20 according to the present invention. Again, several receivers may be coupled to the same power line. Receiver 20 is connected to the power line through a transient protection device 21 which limits power surges, protecting equipment downline. Transient protection device 21 is coupled to a timing controller 27 and a sampler 25.

Timing controller 27 monitors the power line signal r(t) passed from transient protection device 21 and determines fundamental power line frequency. Timing controller 27 provides a timing signal to other elements of receiver 20.

Sampler 25, clocked by the timing controller 27, samples continuous signal x(t) provided to it from transient protection device 21 to produce a series of discrete samples $\{x(n)\}$.

Optionally, a bandpass filter 23 is connected between transient protection device 21 and sampler 25 which removes noise outside the useful spectrum of the HM signaling.

The discrete samples, $\{x(n)\}$ are provided to a quantizer 29 which reduces the precision of the samples to a set of $2^B$ values, where B is the number of bits allocated per sample.

The quantized samples, $\{\hat{x}(n)\}$, are passed to a Fast Fourier Transform (FFT) module 31 which determines the inverse Fourier transform coefficients $\{X_k(t)\}$ for signal $\{\hat{x}(n)\}$. In one embodiment, the Fourier Transform coefficients from FFT module 31 may be passed directly to a decoder 33, which recovers the message bits from the HM signal, as described in Eq. (3) in "Bit Determination" above.

Optionally, a signal-to-noise (S/N) estimation device receives the Fourier coefficients from FFT 31 and determines an estimate for determining the S/N, $|\delta_k|$ from Eq. (2) above for each Fourier coefficient.

A combiner circuit 34 connected between FFT 31 and decoder 33 receives S/N estimate, $|\delta_k|$, and the Fourier coefficients $X_k(t)$, and provides weighting to the coefficients based upon the S/N estimate for that frequency band. This may be any conventional weighting technique, and may be as simple as throwing out coefficients which do not meet a predetermined threshold.

The S/N estimation curve related to Eq. (2) is shown in FIG. 4. The dotted lines indicate a region of ± one sigma standard deviation. There is a high variance to $|\delta_k|$ at the lower S/N ratios.

Averaging

Because the data rate at which the automatic meter reading communications will take place is so low, it will be possible to do a significant amount of post processing. A better estimate of the S/N ratio may be made by averaging $|\delta_k|$ over the number of symbols in a particular message. This averaging will reduce the standard deviation of the estimate of $|\delta_k|$ by the square root of the number of symbols.

Therefore, in an optional embodiment, an averager 36 is placed between S/N estim. unit 35 and combiner 34 which averages $|\delta_k|$ over a plurality of estimations. In FIG. 5, the estimate of the signal-to-noise ratio, produced by averaging $|\delta_k|$ over 100 symbols, is graphed as a function of the true signal-to-noise ratio. Dotted lines are shown bounding the estimate region by one sigma.

Reduced Peak/RMS Power

By limiting the peak to RMS power transmitted by transmitter 10, the dynamic range of the transmitted signal will be narrowed, easing the requirements of amplifier linearity. It was determined that for a certain M, e.g. M=8, certain forms of Eq. (1) would result in near optimum Crest factors by selecting signs of the terms of Eq. (1) according to a Shapiro-Rudin sequence, (See Boyd above). For example, this results in an 8-tone composite signal within the 5–10 kHz band with each tone having equal energy. The form of the ith signal is:

$$s_i(t) = \sin(2\pi f_{i,1} t) - \sin(2\pi f_{i,2} t) + \sin(2\pi f_{i,3} t) + \sin(2\pi f_{i,4} t) - \sin(2\pi f_{i,5} t) + \sin(2\pi f_{i,6} t) + \sin(2\pi f_{i,7} t) + \sin(2\pi f_{i,8} t) \quad \text{Eq. (4)}$$

The table of frequencies $\{f_{i,k}\}$ for the ten simultaneous waveforms is given in Table 1.

TABLE 1

| | $\{f_{i,k}\}$ in Hz | | | | | | | |
|---|---|---|---|---|---|---|---|---|
| i | k = 1 | k = 2 | k = 3 | k = 4 | k = 5 | k = 6 | k = 7 | k = 8 |
| 1 | 5010 | 5610 | 6210 | 6810 | 7410 | 8010 | 8610 | 9210 |
| 2 | 5070 | 5670 | 6270 | 6870 | 7470 | 8070 | 8670 | 9270 |
| 3 | 5130 | 5730 | 6330 | 6930 | 7530 | 8130 | 8730 | 9330 |
| 4 | 5190 | 5790 | 6390 | 6990 | 7590 | 8190 | 8790 | 9390 |
| 5 | 5250 | 5850 | 6450 | 7050 | 7650 | 8250 | 8850 | 9450 |
| 6 | 5310 | 5910 | 6510 | 7110 | 7710 | 8310 | 8910 | 9510 |
| 7 | 5370 | 5970 | 6570 | 7170 | 7770 | 8370 | 8970 | 9570 |
| 8 | 5430 | 6030 | 6630 | 7230 | 7830 | 8430 | 9030 | 9630 |
| 9 | 5490 | 6090 | 6690 | 7290 | 7890 | 8490 | 9090 | 9690 |
| 10 | 5550 | 6150 | 6750 | 7350 | 7950 | 8550 | 9150 | 9750 |

For these signals $\{s_i(t)\}$, the Crest Factor is 6 dB. By employing the signaling waveform of a Shapiro-Rudin sequence, the Crest Factor is significantly reduced.

While several presently preferred embodiments of the novel invention have been described in detail herein, many modifications and variations will now become apparent to those skilled in the art. It is, therefore, to be understood that the appended claims are intended to cover all such modifications and variations as fall within the true spirit of the invention.

What we claim is:

1. A system for communicating digital information over a wire having a harmonic interference frequency lobes comprising:

a) a transmitter for transmitting message bits of a signal $s_1$ having:

i. a carrier wave synthesis device for creating a carrier wave having a plurality of frequency lobes between interference lobes described by:

$$s_i(t) = \sum_{k=1}^{M} \{\alpha_k \sin(2\pi f_{ik} t + \phi_k) + \beta_k \cos(2\pi f_{ik} t + \theta_k)\}$$

where t is time, $f_{ik}$ are frequencies between said harmonic interference lobes, M is the number of signal frequency lobes desired, $\alpha_k$, $\beta_k$, are predetermined signal amplitudes, and $\phi k, \theta k$ are predetermined phase offsets;

ii. a bit encoder coupled to a timing device, the synthesis device, and said wire, which inverts a carrier waveform for a single bit period for one bit value of said message bit, and leaves the carrier wave unchanged for a second message bit value to create an encoded message;

iii. a summation device coupled to the bit encoder and said wire, for summing the encoded message with existing signals on said wire;

b) a receiver coupled to said wire which decodes the encoded message into message bits.

2. The system for communicating digital information over a wire of claim 1 wherein the carrier wave synthesis device comprises:

a) a timing device to determine bit periods, and bit rate timing;

b) a storage device having a prestored carrier waveform;

c) a playback device coupled to the timing device and the storage device for playing back the prestored waveform according to bit rate timing.

3. The system for communicating digital information over a wire of claim 1 wherein the receiver comprises:

a) a sampler which converts a continuous signal into a series of discrete time samples;

b) a quantizer coupled to the sampler which reduces the precision of the discrete time samples;

c) a Fourier Transform device which performs a Fourier transform on the samples obtained at time t to result in Fourier coefficients $X_k(t)$;

d) a decoder which performs an inner product of the Fourier coefficients $X_k(t)$, and determine if the inner product is above or below a predetermined threshold to produce decoded message bits.

4. The system for communicating digital information over a wire of claim 3 further comprising:

a) a signal-to-noise (S/N) estimation device which estimates S/N based upon a reliability indication estimate $|\delta_k|$ for each of the Fourier coefficients;

b) a combiner which weights each of the Fourier coefficients $X_k(t)$ according to $|\delta_k|$ to result in weighted Fourier coefficients $X_k(t)$ passed to the decoder used in place of $X_k(t)$ in determining bit decisions.

5. The system for communicating digital information over a wire of claim 3, further comprising:

a) a signal-to-noise (S/N) estimation device which estimates $|\delta_k|$ from Fourier coefficients acquired at times t and t−1, $X_k(t)$, $X_k(t-1)$, respectively according to the equation:

$$|\delta_k| = \left| \frac{x_1 x_2 + y_1 y_2}{\sqrt{x_1^2 + y_1^2} \sqrt{x_2^2 + y_2^2}} \right|$$

where $X_k(t-1) = x_1 + jy_1$ and $X_k(t) = x_2 + jy_2$ for each of the Fourier coefficients;

b) a combiner which weights each of the Fourier coefficients $X_k(t)$ according to $|\delta_k|$ to result in weighted Fourier coefficients $X_k(t)$ passed to the decoder used in place of $X_k(t)$ in determining bit decisions.

6. The system for communicating digital information over a wire of claim 4 further comprising:

an averager coupled between S/N estimation device and the combiner for receiving a plurality of $|\delta_k|$ estimates for Fourier coefficients $X_k(t)$ over time, and performing an average of $|\delta_k|$ to result in an $\overline{|\delta_k|}$ for each lobe, provided to the combiner, and used in place of $|\delta_k|$ to result in the modified Fourier coefficients $X_k(t)$.

7. The system for communicating digital information over a wire of claim 1 further comprising a plurality of transmitters each transmitting digital signals $s_i$, where $i \neq 1$ at frequencies between harmonic interference lobes, but at frequencies different than those of other transmitters of the system.

* * * * *